Feb. 20, 1923.

M. W. STOUFFER

NONSKID APPLIANCE

Filed Nov. 15, 1919

1,446,074

2 sheets-sheet 1

WITNESSES
S. O. Mankin.

INVENTOR
M. W. STOUFFER,
BY
ATTORNEYS

Feb. 20, 1923.
M. W. STOUFFER
1,446,074
NONSKID APPLIANCE
Filed Nov. 15, 1919
2 sheets-sheet 2
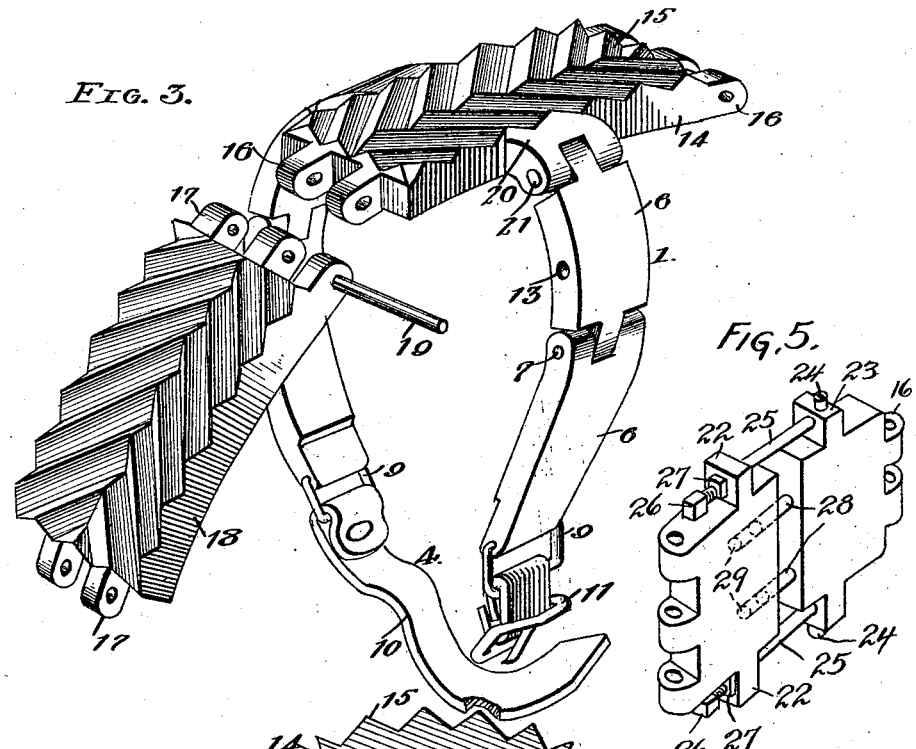
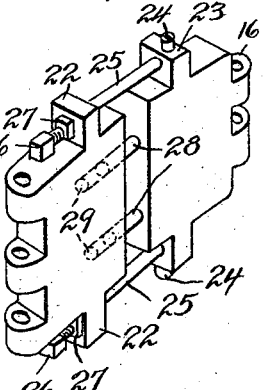
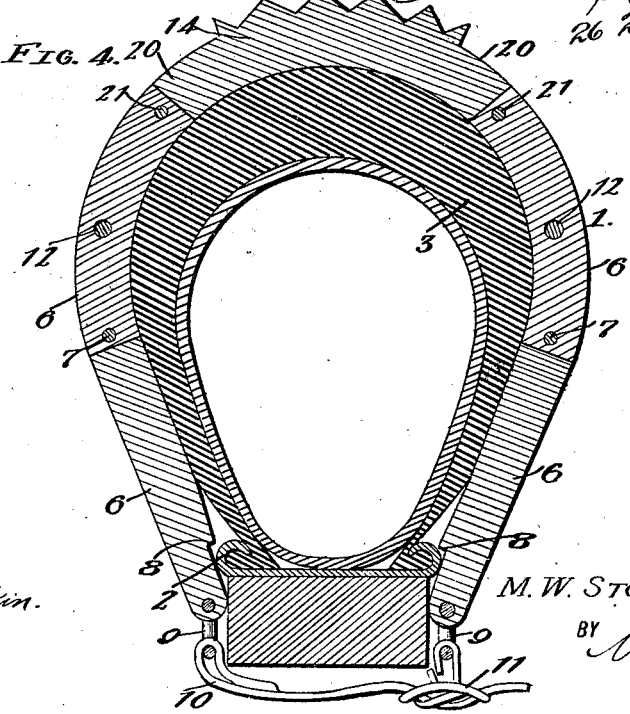
WITNESSES
S. O. Mankin.
INVENTOR
M. W. STOUFFER.
BY
ATTORNEYS Patented Feb. 20, 1923.

1,446,074

UNITED STATES PATENT OFFICE.

MARKEY WELLER STOUFFER, OF WASHINGTON, DISTRICT OF COLUMBIA.

NONSKID APPLIANCE.

Application filed November 15, 1919. Serial No. 338,198.

*To all whom it may concern:*

Be it known that I, MARKEY WELLER STOUFFER, a citizen of the United States, and a resident of Washington, in the District of Columbia, have invented certain new and useful Improvements in Nonskid Appliances, of which the following is a specification.

My invention relates to improvements in non-skid appliances for motor vehicle tires, and it consists in the constructions, combinations and arrangements herein described and claimed.

The foremost object of my invention is to provide a simple but effective non-skid device, applicable either to the pneumatic or solid type of motor vehicle tires, without in any way modifying or altering either the construction of the tire or the rim of the wheel.

A further object of the invention is to provide a simple, peripherally attachable tire armor, which can be put on or taken off, with the same facility as the ordinary well known non-skid chain.

A further object of the invention is to provide an improved tire armor which can be easily strapped or otherwise fastened in place around the tire and rim of the wheel, being left in place permanently if desired.

A further object of the invention is to provide an improved non-skid attachment for tires, embodying means for preventing lateral creeping on the tire.

Other objects and advantages will appear in the following specification, reference being had to the accompanying drawings, in which:—

Figure 1:
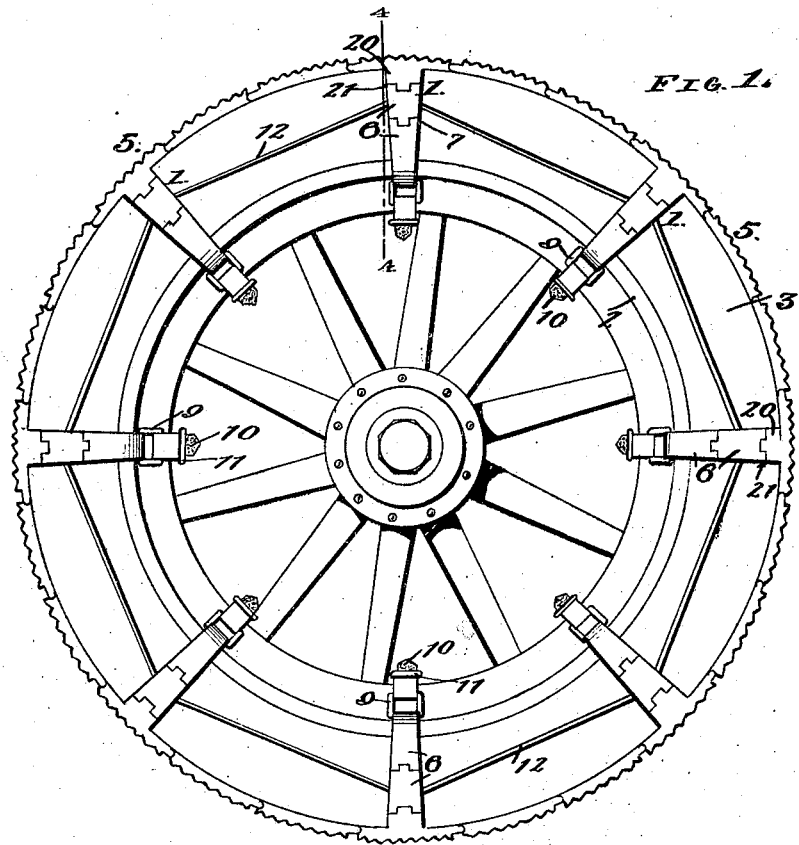
Figure 2:
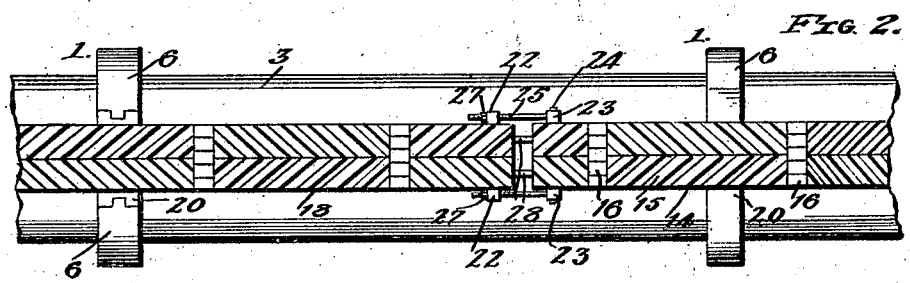
Figure 6:
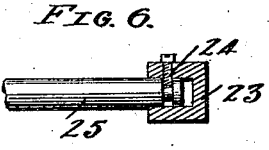

Figure 1 is a side elevation of a wheel, illustrating the improved non-skid device applied to the periphery of the tire, Figure 2 is a plan view of a portion of the non-skid appliance, also illustrating means for making longitudinal adjustments to take up slack, Figure 3 is a detail perspective view of a portion of the non-skid appliance, showing one of the attaching yokes with a companion corrugated tread plate, Figure 4 is a detail cross section taken substantially on the line 4—4 of Figure 1, illustrating the mode of application of one of the yokes more clearly, Figure 5 is a detail perspective view illustrating the adjusting means between a pair of the plates, shown in Figure 2, and Figure 6 is a detail sectional view showing the swivel connection of one of the adjusting screws.

Generally speaking, the invention comprises a plurality of yokes 1, which on the inner extremities are secured beneath the rim or felly 2 of the tire 3 by any suitable fastening means 4, and on the outer extremities join a linked tread belt 5. Describing first, one of the yokes 1, this is seen in Figure 3 to consist of a plurality of sections 6, suitably hinged together at 7 to make the yoke adaptable to slight variations in the shape of the tire.

The innermost sections may either be perfectly straight as shown in Figure 4, or they may be slightly curved as desired. They are provided with shoulders 8 which are usually close enough to the adjacent parts, as for example, the rim to which the tire is attached, to abut these parts and prevent lateral motion of the tread 5 with respect to the tire.

Connected to the innermost extremities of the sections 6 are links 9, one of which carrying the strap 10 of the fastening means 4, the other carrying the buckle 11. The mode of fastening the yoke 1 to the wheel is not confined to the strap and buckle connections shown in the drawings. Any desired fastening means can be employed because in actual practice one type may be found better than the other. A strap and buckle is shown because this constitutes a well known arrangement and is easily manipulated.

Running around the sides of the tire 3 and connecting all of the upper or outermost sections of the yokes 1 are cables 12. These cables are threaded through holes 13 in the outermost sections as clearly shown in Figure 1. These cables are illustrated so that it may be known that auxiliary fastening means can be employed.

Ordinarily it is not necessary to use both the cables 12 and the fastening means 4, but both can be used if desired. In case only the cables 12 are employed, the innermost section 6 and fastening means 4 can be dispensed with entirely, the cables 12 then acting the same as the annular chains or cables of the well known types of anti-skid arrangements to hold the tread 5 in place.

Carried by each yoke 1 and forming a part thereof, is a yoke tread plate 14 with surface corrugations or serrations 15 as clearly shown in Figure 3. Formed on the longitudinal extremities of the yoke tread plate 14 are hinge lugs 16 to cooperate with similar lugs 17 on the ends of the intermediate corrugated tread plates 18.

Hinge pins 19 fit through the various lugs when placed together in a manner obviously to be understood from the drawings, so that a flexible tire tread results. This flexible tread readily gives to the yielding of the tire and provides a very satisfactory anti-skid shoe. Lateral lugs 20 receive hinge pins 21, to which the outermost yoke sections 6 are connected.

It will in many cases be necessary to effect certain adjustments of the flexible anti-skid tread in applying it to the tire. Such adjustments are made by the means shown in Figures 2 and 5. A pair of the intermediate plates 18 are provided with lugs 22, 23, the latter providing a swivel connection 24 for the adjusting screws 25. These screws are threaded at the upper ends and occupy suitably threaded bores in the lugs 22.

Adjustments are made by turning the heads 26 of the adjusting screws, then fixing the adjustment by means of the jam nuts 27. Dowel pins 28 on one of the half tread plates, fit in suitable recesses 29 in the companion plate, so that the alinement of the plates is not destroyed and the adjusting screws 25 are relieved of undue strains.

While the construction and arrangement of my anti-skid appliance as herein described and claimed, is that of a generally preferred form, obviously modifications and changes may be made without departing from the spirit of the invention or the scope of the claims.

I claim:—

1. An anti-skid tread, comprising a pair of attaching yokes consisting of sections hinged together, the innermost sections having shoulders for abutting a rim, with suitable securing means reaching across the ends of said sections; a yoke tread plate with lugs to which the outermost sections are hinged, and intermediate tread plates hinged together and to the tread plates of said yokes.

2. An anti-skid tread, comprising a plurality of plates hinged on end, certain ones of the plates having side lugs; a plurality of sections hinged together and to each of the lugs, and extending inwardly in respect to a tire, shoulders formed near the extremity of each inner section to abut an adjacent tire mounting and prevent creeping of the tread, links carried by said sections, buckles carried by certain links, and straps carried by others, to reach beneath a felly and secure the tread on a tire.

MARKEY WELLER STOUFFER.